Dec. 5, 1933.  J. P. BLAND  1,938,242
VEHICLE BRAKE TESTER
Filed Dec. 30, 1931  2 Sheets-Sheet 1
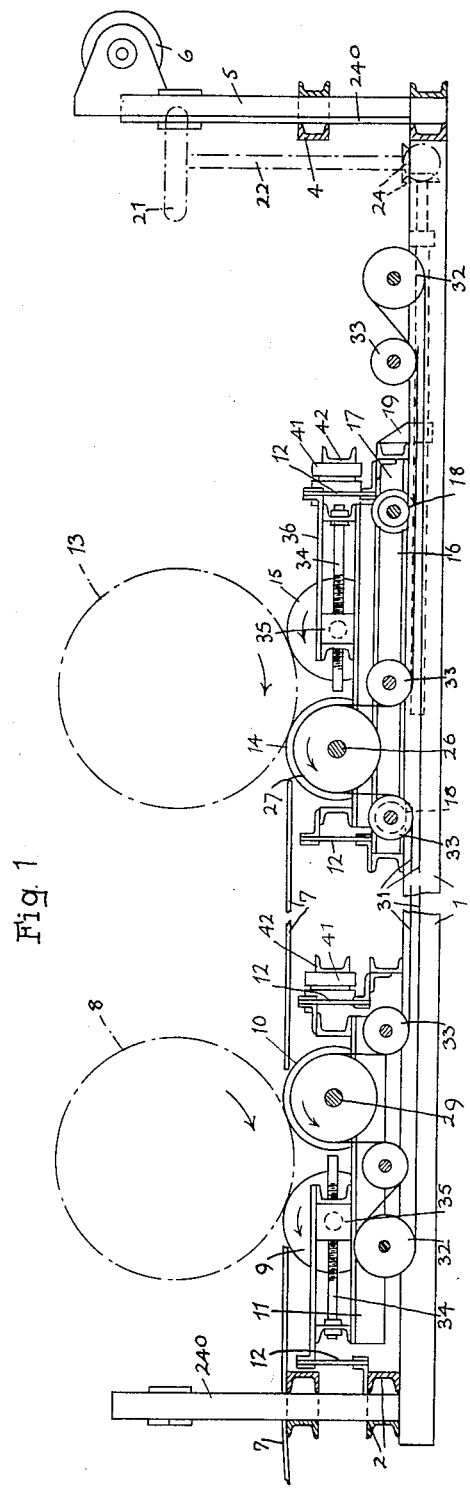
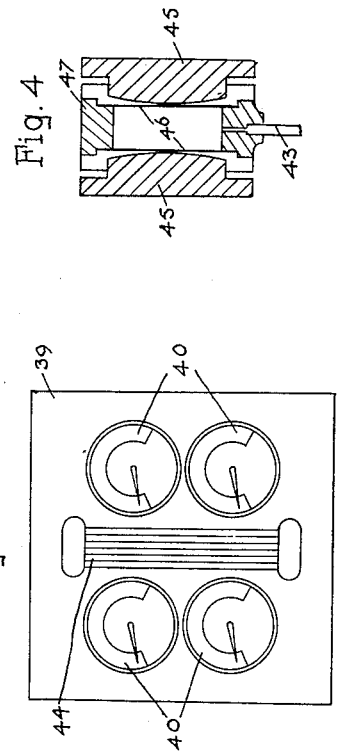
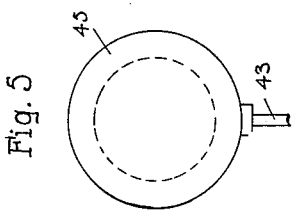
INVENTOR
John Parkinson Bland
By Alexander & Powell
Attorneys Dec. 5, 1933.                J. P. BLAND                1,938,242
                         VEHICLE BRAKE TESTER
                        Filed Dec. 30, 1931         2 Sheets-Sheet 2

INVENTOR
John Parkinson Bland
By Alexander Dowell
Attorney

Patented Dec. 5, 1933

1,938,242

UNITED STATES PATENT OFFICE 1,938,242

VEHICLE BRAKE TESTER

John Parkinson Bland, London, England

Application December 30, 1931, Serial No. 584,000, and in Great Britain December 2, 1931

9 Claims. (Cl. 265—25)

This invention relates to machines for testing the relative adjustment of the brakes of an automobile and/or for taking dynamometer measurements of power transmitted through the road-wheels of an automobile.

According to the present invention, a brake testing machine of the type specified above, is characterized by the fact that there is interposed between each cradle and the frame of the machine a resilient supporting intermediary constituting the sole supporting means of the cradle upon the frame and adapted to permit the horizontal movement of the cradle relatively to the frame and also resiliently to locate the cradle normally at one end of its path of said horizontal movement.

Hitherto, in machines of the type referred to, the horizontally displaceable cradles have been mounted upon the frame through the intermediary of flanged rollers and co-operating rails or runner bars on the cradle and frame.

This arrangement, however, as will be appreciated, involves, especially in the case of heavy vehicles, a considerable amount of friction as between the rollers, their bearings and the said rails or runner bars, and this friction tends to vary from cradle to cradle, that is to say, it tends not to be uniform or the same for each cradle, with the result that the brake testing indications in respect of the several wheels of the vehicle are vitiated and a true measurement of the relative applied braking efforts for the several wheels is unobtainable.

By mounting each cradle, however, in accordance with the present invention, upon a resilient supporting intermediary constituting the sole supporting means of the cradle upon the frame and adapted by flexing to permit the horizontal movement of the cradle relatively to the frame, all such friction as that referred to above is entirely eliminated and an exceedingly accurate brake testing reading for each of the several cradles is readily obtainable.

In the use of the machine, the vehicle is placed in position with its road-wheels resting upon the false tracks so that the latter are caused to take the weight of the vehicle. The vehicle having been fixed to this position, the engine is started and the road-wheels are driven on their false tracks, which latter move of course to permit rotation of the road-wheels. As soon as a predetermined road-wheel speed is attained, the driver de-clutches the engine and applies the brakes. This, due to the inertia of the moving parts, produces, through the intermediary of the false tracks, horizontal thrust upon the cradles in a direction opposed to the constraint of the resilient locating means, and the resulting horizontal movement of the cradles occasions the actuation of the torque indicator. The torque indicators, which may take any convenient form, register the applied braking efforts, for example, in terms of foot-pounds.

According to a further feature of the invention, the machine may be adapted to the taking of dynamometer measurements, that is to say, to the measurement of road-wheel thrust, and for this purpose may comprise means for braking the moving of the false tracks as these parts are driven by the engine of the automobile through the intermediary of the driving road-wheels.

In the use of the machine for the taking of dynamometer measurements, the vehicle is positioned, as before, with its driving road-wheels supported upon the false tracks provided to receive them and the engine of the vehicle is started and clutched-in to the road-wheels. Then, at one or more predetermined road-wheel speeds, the said braking means for the false tracks are applied. This, as in the brake testing case, sets up thrust in the false track cradles in a direction opposed to the yielding constraint of the locating means, and, in consequence, the cradles move relatively to the frame and the torque indicators operate to register the driving thrust applied through the road-wheels, for example, again, in terms of foot-pounds.

According to a still further feature, in order to adapt the machine to use with vehicles provided with front-wheel brakes as well as rear-wheel brakes and wherein the driving road-wheels are at one end only of the vehicle, for example, the rear end, the false tracks for the non-driving road-wheels of the vehicle are interconnected by power-transmission means to the false tracks for the driving road-wheels, so as to be driven thereby for the transmission of torque to the non-driving road-wheels from the driving road-wheels through the intermediary of the forward and rear false tracks and the interconnecting power-transmission means.

The improved machine embodying the present invention may be so constructed as to be adapted for use with six-wheeled vehicles, such as six-wheel omnibuses, lorries and the like. To this end it is only necessary to duplicate the set of false tracks for the rear road wheels with their supporting cradles, resilient locating means for the cradles, torque indicators and operative connections between said indicators and the corresponding cradles, providing one set for the forward driving wheels of the vehicle and another for the rear driving wheels.

In this modified arrangement, the two sets of rear-wheel false tracks may be adjustable towards and away from one another for the purpose of accommodating the machine to suit various wheel-base lengths between the forward and rear driving wheels.

As will be appreciated, the momentum of the moving parts of the machine, for example, the false tracks, and the power-transmission means between them, taken in conjunction with the momentum of the road-wheels and other moving parts of the vehicle, should approximate to the total momentum of the automobile in actual running on the road. Consequently, it is generally necessary to construct the track drums with somewhat heavy scantlings in order to provide for the requisite inertia of the moving parts.

According to another feature of the invention, in order to adapt the machine for use with cars of widely various sizes, each false track may be combined with one or more momentum bodies having operative connection with the track and provided with means whereby they may be brought, either one or more, according to the size and weight of the vehicle, into gear with the track so as to adjust as required the total momentum of the parts.

The invention will now be further described with reference to the accompanying drawings, which illustrates, more or less diagrammatically, one embodiment by way of example as applied to a machine for testing the relative adjustment of the brakes of a vehicle fitted with four-wheel brakes and the rear-wheels only of which are driving wheels. In the drawings:—

Figure 1 is a side elevation of the machine:

Figure 3 is a diagrammatic representation of an instrument board showing the torque indicators of the machine, and Figures 4 and 5 are a longitudinal section and end view, respectively, of one of the indicator rams.

Like reference characters indicate like parts in the various figures.

Figure 2:
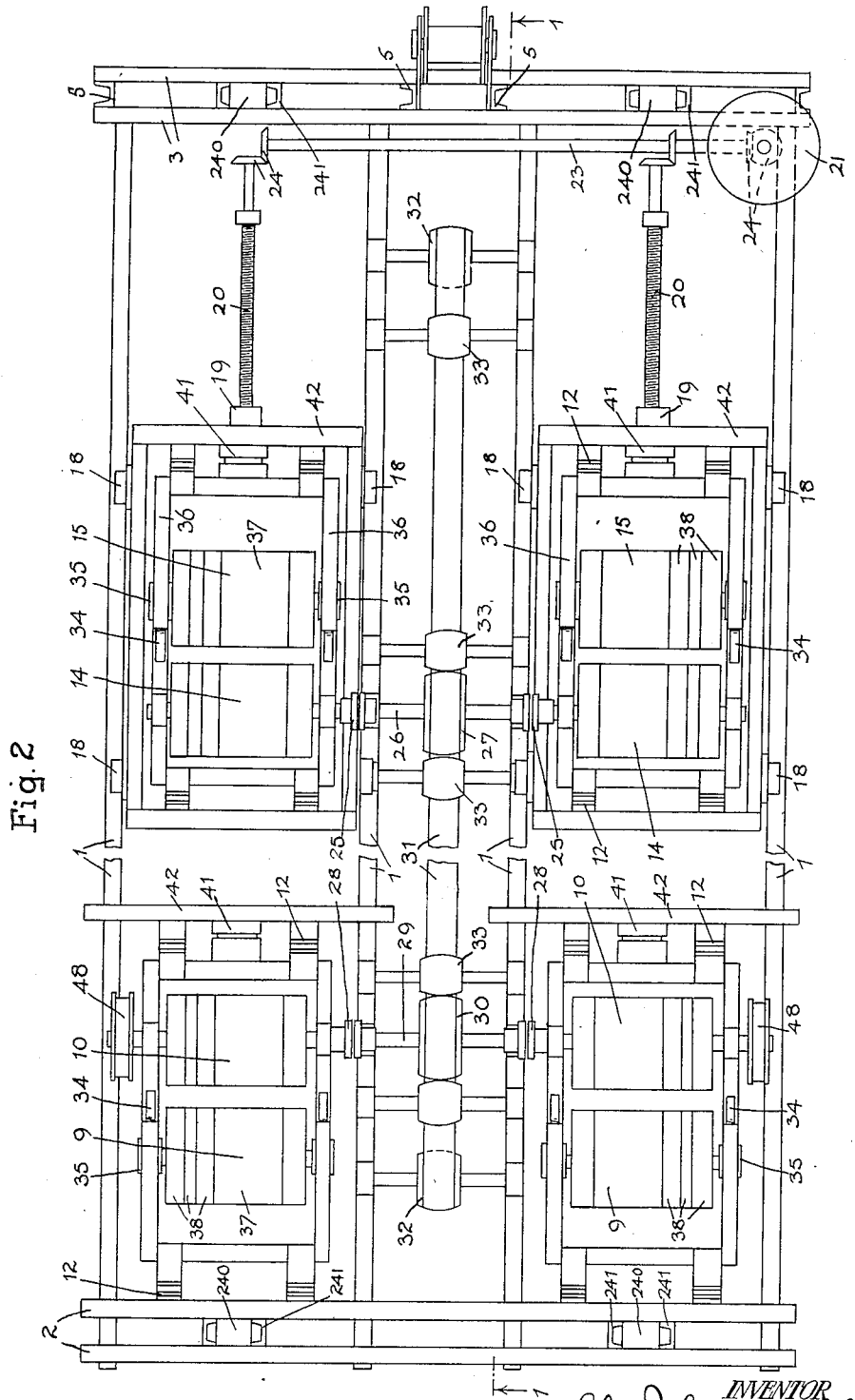
Figure 2 is a plan view of the machine.

The machine comprises a frame consisting of four main longitudinal frame members 1 braced together at one end by transverse frame members 2, and held together at the other end by other transverse frame members 3. Said frame members 3 are spaced apart, as shown, and situated immediately above them are a second pair of frame members 4, suitably supported upon uprights 5. The centre pair of uprights 5 are higher than the others, as shown, and carry at the top a sheave 6, over which a hoisting rope may be drawn to haul the vehicle up into position upon the machine along ramps 7 (shown only in Figure 1).

When the vehicle is in position upon the machine, each of its rear driving wheels 8 rests upon a pair of supporting drums 9, 10. These drums are supported in bearings mounted upon a cradle 11, which, in turn, is resiliently supported upon the frame-work of the machine through the medium of leaf springs 12, so as to possess, as a floating member, a slight freedom of movement horizontally in the direction of length of the vehicle.

Similarly, each of the front wheels 13 of the vehicle rests upon a pair of rollers 14, 15 supported in bearings mounted upon a floating cradle 16. Said cradle 16, however, is mounted, not directly upon the frame of the machine, but upon a trolley 17 rollable on rollers 18 along the frame members 1 towards and away from the cradle 11.

The purpose of this adjustability of the forward cradle 16 relatively to the rear cradle 11, is, as previously indicated herein, to accommodate the machine to various wheel-base lengths, and the means by which the adjustment is effected comprises a nut 19 on the cradle and a screw 20, working through the nut and operated by a hand-wheel 21 through the medium of interconnecting shafts 22, 23 and bevel gearing 24.

As will be appreciated, it is necessary in the use of the machine to fix the vehicle firmly in the machine once it has been placed in position upon the false track drums, and for this purpose, removable lashing posts 240 are provided at each end of the machine. These posts are mounted in sockets 241 in the machine framework.

In order that the front-wheels 13 of the vehicle shall be driven for the testing of their brakes, the spindles of the false track drums 14 are coupled, through a flexible coupling 25, to a belt-wheel shaft 26 carrying a belt-wheel 27. Similarly, the spindles of the track drums 10 at the other end of the machine, are coupled, through flexible couplings 28, to a belt-wheel spindle 29 carrying a belt-wheel 30. Guided over these belt-wheels 27, 30 is an endless transmission belt 31 also guided over terminal pulleys 32 situated one at each end of the machine, as shown. The arrangement is such that the front-wheel cradles 16 may be adjusted towards and away from the rear-wheel cradles 11 to suit, as described, various wheel-base lengths, without effecting the drive as between the transmission belt 31 and the movable belt-pulley 27. To this end, the four guide rollers 33 for the transmission belt are all located in one and the same horizontal plane, so that the translation along the belt of the guide rollers on the trolley 17 as the adjustable cradle is moved towards and away from the other cradle is prevented from altering the effective length of the belt between the two remote rollers 33.

For the purpose of accommodating the machine to various-sized road-wheels, each pair of false track drums is provided with means whereby the horizontal distance between the axes of the two drums may be adjusted. The means to this end, comprises, in the machine illustrated, a pair of screws 34, working in nuts 35 carrying the journals for the false track drums (9, 15) and slidable along guides 36 as the screw 34 is turned. The screw 34 may be turned by any convenient form of manipulating means, for example, a handle keyed to the screw.

In order to accommodate the machine to vehicles of varying sizes and weights, each false track drum is of sectional construction in the axial direction, as shown. The main section 37 is permanently keyed to the drum spindle. The other sections 38 are freely revoluble on the spindle and are arranged to be rotatively engaged therewith, in any desired number, according to the size of the vehicle, by means of a key or keys slidable along the spindle and co-operating key-ways or recesses in the bosses of the drum sections.

The torque indicators of the machine are four in number, one for each of the four cradles 11, 16. They are mounted upon an instrument board 39, and their dials are marked 40. The instrument board 39 may be mounted in any convenient position in relation to the rest of the machine.

The several indicators are of the pressure-gauge type and each is actuated by a ram 41 interposed between the forward end of the corresponding cradle and a transverse frame member 42, securely affixed at its ends to the longitudinal frame members 1. The indicator is connected to this ram 41 by a conduit 43 and the operative-fluid space within the ram, the interior of the conduit 43 and the interior of the operating parts of the indicator are filled with an incompressible fluid, for example, glycerin.

Conveniently, the indicating means may comprise, in addition to torque dials (40), a recording device for the torque measured. For example, the indicating means may comprise a wide ribbon of paper 44 (Figure 3) movable lengthwise past four pencils (not shown) allocated one to each indicator and traversed thereby across the ribbon as the latter is advanced by rotation of a draw reel for the ribbon operatively connected by a flexible shaft to one of the false track drums.

The indicator rams 41 may take any convenient form. In the construction shown, the ram comprises two opposed plunger members 45, separated by a pair of flexible diaphragms 46, closing the otherwise open ends of a short cylinder 47 filled with glycerin or other operating-fluid for the ram. As will be appreciated, in consequence of the slightest relative axial movement towards one another of the plunger members 45, the capacity of the space enclosed within the cylinder 47 between the diaphragm 46 becomes reduced and, in consequence, the glycerin or other operating fluid accommodated within said space becomes ejected therefrom, with the result that the operating-fluid at the other end of the indicator system is caused to actuate the indicator.

As shown, the flexible diaphragms 46 are normally, that is to say, prior to the application of an initial pressure of about 20 lbs. per square inch in the indicator system, spaced a very short distance from the faces of the adjacent rams. This space disappears when the said initial pressure is applied, so that, as stated, the slightest operative horizontal movement of the cradle will occasion the actuation of the indicator.

To enable dynamometer measurements (tractive force of road-wheels) to be made by the machine, the forward track drums 10 on the rear-wheel cradle are provided with band brakes 48. Obviously, any other convenient form of braking means for the false tracks may be provided for this purpose. Also, if desired, the indicator dials 40 may be provided with dual scales for co-operation with a single pointer, one of the scales being calibrated to register braking effort and the other to show tractive road-wheel force.

The reason for the slight longitudinal movement of the cradles 11, 16 which occasions the operation of the rams 41, and, in consequence, the corresponding indicators 40, will be apparent from the foregoing description of the machine. It may be explained, however, that this slight floating movement of the cradles is due to the torque-reaction which is set up as between the peripheries of the false track drums and the road-wheels of the vehicle, due, in the case of brake testing, to the momentum of the various rapidly moving parts upon declutching the engine and applying the brakes, and, in the case of measurement of the tractive force of the road-wheels, to the braking effort which is applied to the false tracks by the application of the band brakes 48.

As previously indicated herein, the machine may be modified to adapt it for use with six-wheeled vehicles, that is to say, vehicles with four driving wheels at the rear, by duplicating the set of false tracks for the rear wheels with their cradles, resilient locating means, torque indicators and other associated parts. Thus, conveniently, there may be provided immediately in advance of the fixed cradle 11, a second cradle generally similar to the adjustable cradle 16, this second cradle being adjustable on the frame members 1 towards and away from the fixed cradle 11 to vary the distance between the effective centres of the rear and forward driving wheel tracks carried respectively upon the two cradles—the fixed cradle 11 and the additional adjustable cradle. The adjustment of these adjustable rear cradles may be effected by similar means to that employed for adjusting the front wheel cradles of the machine.

In this arrangement, the transmission belt 31 may be arranged to transmit power to the front wheels of the vehicle both from the rear and also the forward driving road wheels of the vehicle, and for this purpose, the spindles of the rear false track drums of the two pairs located to the forward driving wheels of the vehicle may be coupled by means of flexible couplings, such as the couplings 25, to a belt-wheel shaft, such as the shaft 26, carrying a belt-wheel similar to the belt-wheel 27, and the transmission belt 31 may be guided by means of pulleys, such as the pulleys 33, over this belt-wheel.

Also, to enable the machine in its six-wheeled form to be used for measuring road thrust from all four of the driving wheels of the vehicle, the said spindles of the false tracks for the forward pair of driving road wheels may be extended and fitted with a band brake similar to the brake 48.

Further, in view of the limited available space between the forward and rear cradles for the rear driving road-wheels, the rams for the rear cradles may be situated in rear of these cradles and be connected thereto by tension bolts instead of arranging that these particular rams shall, as in the case of the other rams of the machine, be operated by direct compression thrust from the floating cradle.

What I claim is:—

1. In a machine for testing the relative adjustment of the brakes of the driving road-wheels of an automobile, the combination comprising a plurality of false tracks, one for each of the road wheels, each track consisting of an endless moving supporting-surface for the wheel, a supporting cradle for each false track, a frame upon which the several cradles are mounted each with freedom of substantially horizontal movement relatively to the frame in the direction of length of the vehicle, resilient locating means for each cradle, arranged normally to locate the cradle at one end of its path of relative movement, a torque indicator for each road-wheel, an operative connection between each torque indicator and the corresponding cradle, whereby relative movement of the cradle and the frame against the constraint of the locating means is caused to actuate the indicator to a degree corresponding to the extent of said relative movement, momentum bodies operatively connected with the false tracks and means whereby these bodies may be brought into gear with the tracks to adjust as required the total momentum of the parts.

2. In a machine for testing the relative adjustment of the brakes of the driving road-wheels of an automobile, the combination of parts specified in claim 1, wherein the false tracks each take the form of a pair of drums disposed horizontally one in advance of the other in the direction of length of the vehicle when the latter is in position upon the machine, the road-wheel of the vehicle being arranged to run upon both drums together and each drum being axially of sectional form and mounted upon a spindle and the several sections of each drum, with the exception of one main section which is fixed to the spindle, being loosely revoluble on the drum spindle and arranged to be engaged therewith by means of a locking key slidable along the shaft to adjust as required the total momentum of the track.

3. In a machine for testing the relative adjustment of the brakes of the driving road-wheels of an automobile, the combination comprising a plurality of false tracks, one for each of the road-wheels, each track consisting of an endless moving supporting-surface for the road-wheel, arranged to be driven by said road wheel, a supporting cradle for each false track, a frame upon which the several cradles are mounted, a resilient supporting intermediary for each cradle, interposed between the cradle and the frame, constituting the sole supporting means of the cradle upon the frame and adapted by flexing to permit substantially horizontal movement of the cradle relatively to the frame in the direction of length of the vehicle and also resiliently to locate the cradle normally at one end of its path of said horizontal movement, a torque indicator for each road-wheel and an operative connection between each torque indicator and the corresponding cradle, whereby relative movement of the cradle and the frame against the constraint of the locating means is caused to actuate the indicator to a degree corresponding to the extent of said relative movement.

4. In a machine for testing the relative adjustment of the brakes of the driving road-wheels of an automobile, the combination of parts specified in claim 3, wherein the resilient cradle-supporting intermediaries consist of vertically disposed leaf springs upstanding from the frame of the machine, the cradles being mounted upon the upper end of the leaf springs.

5. In a machine for testing the relative adjustment of the brakes of the driving road-wheels of an automobile, the combination of parts specified in claim 3, wherein the torque indicators are of the fluid-pressure operated type and are arranged to be actuated by incompressible fluid expressed into the indicator from a flexible-walled hollow buffer filled with said fluid and interposed in the path of the operative movement of the cradle relatively to the frame between said cradle and frame so as to be compressed by the cradle during its said movement.

6. In a machine for testing the relative adjustment of the brakes of the driving road-wheels of an automobile, the combination of parts specified in claim 3, wherein the resilient cradle-supporting intermediaries consist of vertically disposed leaf springs upstanding from the frame of the machine, the cradles being mounted upon the upper end of the leaf springs, and the torque indicators are of the fluid pressure operated type and are arranged to be actuated by incompressible fluid expressed into the indicator from a flexible-walled hollow buffer filled with said fluid and interposed in the path of the operative movement of the cradle relatively to the frame between said cradle and frame so as to be compressed by the cradle during its said movement.

7. In a machine for testing the relative adjustment of the brakes of the driving road-wheels of an automobile, the combination of parts specified in claim 3, wherein the resilient cradle-locating means consists of leaf springs upstanding from the frame of the machine, the cradles being mounted upon the upper end of the leaf springs, and the torque indicators are of the fluid-pressure operated type and are arranged to be actuated by incompressible fluid expressed into the indicator from a flexible-walled hollow buffer filled with said fluid and interposed in the path of the operative movement of the cradle relatively to the frame between said cradle and frame so as to be compressed by the cradle during its said movement.

8. In a machine for testing the relative adjustment of the brakes of the driving road-wheels of an automobile provided with front-wheel brakes as well as rear-wheel brakes and wherein the driving road-wheels are at one end only of the vehicle, the parts specified in claim 3 in combination with power-transmission means interconnecting the false tracks for the non-driving road-wheels of the vehicle and the false tracks for the driving road-wheels.

9. In a machine for testing the relative adjustment of the brakes of the driving road-wheels of an automobile provided with front-wheel brakes as well as rear-wheel brakes and wherein the driving road-wheels are at one end only of the vehicle, the parts specified in claim 3, in combination with power-transmission means interconnecting the false tracks for the non-driving road-wheels of the vehicle and the false tracks for the driving road-wheels and comprising a belt-pulley in driving connection with the front wheels false tracks, a similar belt-pulley in driving connection with the rear-wheel false tracks, an endless belt interconnecting the belt-pulleys, rollers guiding said belt over the belt-pulleys, and a pair of terminal pulleys situated one on each end of the belt-loop, the cradles carrying the false tracks allocated to the road-wheels at one end of the vehicle being adjustable along the frame of the machine, and the belt-pulley in driving connection with those false tracks which are carried upon these adjustable cradles being movable with said cradles to any position to which they are adjusted without disengagement from the belt.

JOHN PARKINSON BLAND.